United States Patent Office 2,894,460
Patented July 14, 1959

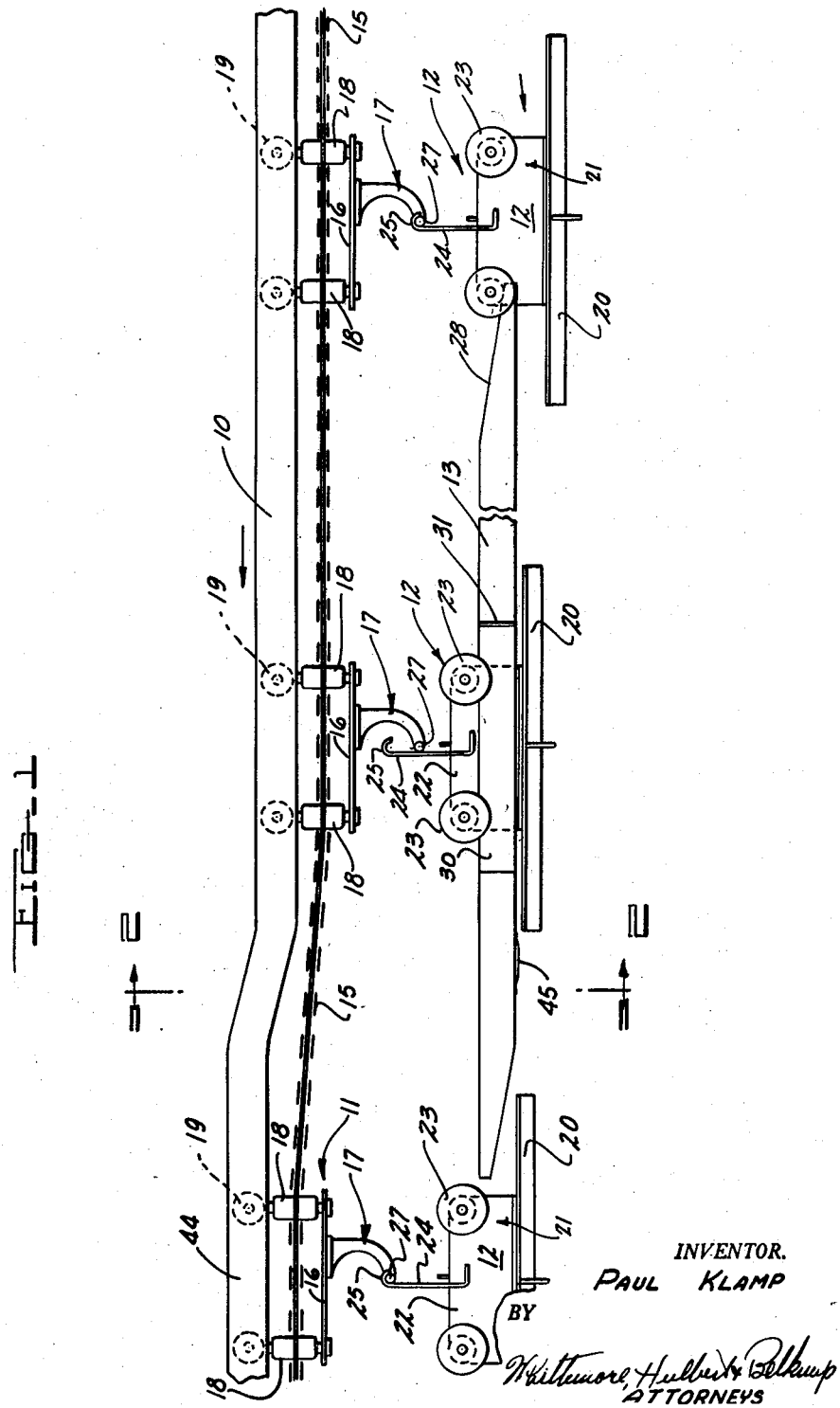

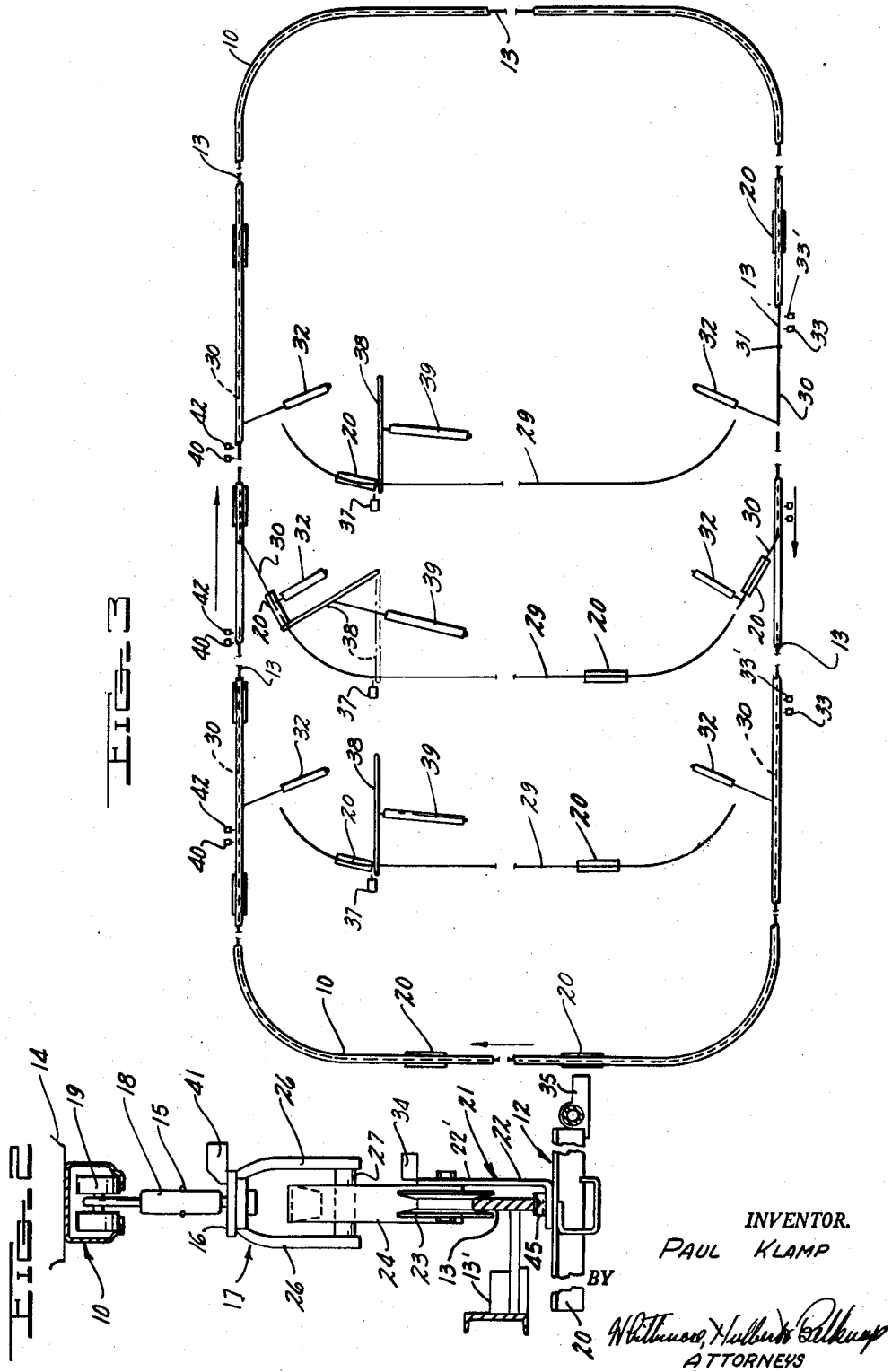

2,894,460
CONVEYOR SYSTEM

Paul Klamp, Detroit, Mich., assignor to Mechanical Handling Systems, Inc., Detroit, Mich., a corporation of Michigan Application September 20, 1954, Serial No. 457,026

3 Claims. (Cl. 104—88)

This invention relates generally to work handling conveyors and refers more particularly to improvements in so-called power and free conveyor systems.

Conveyor systems of the above general type usually comprise a main track, a trolley movable along the track by suitable power means, a work carrier releasably connected to the trolley for movement by the latter, a supplementary track arranged to support the carrier when the latter is released from the trolley. In may instances, the supplementary track is inclined to enable the work carrier to be advanced by gravity along the supplementary track after said carried is released from the power driven trolley. Also, in numerous installations the operative connection between the power driven trolley and the work carrier comprises a pivotally mounted hook together with mechanism for releasing the hook in timed relationship to engagement of the carrier with the supplementary track.

In practice, the supplementary track usually has one or more switches enabling the work carrier coasting along the same to be transferred to a branch track where it may be detained for a specified period without interfering with the normal operation of the power driven conveyor. It has also been the practice to employ limit switches for operating the track switches at the proper time and for operating suitable mechanism to move the work carriers from the branch track to positions on another supplementary track where the carriers may again be picked up by the power driven trolleys.

Conveyor systems of the type briefly noted above have been found suitable for numerous applications but, nevertheless, are not entirely satisfactory. In the first place, the pivoted hook and the means for operating the same not only complicate as well as increase the cost of the installation but, in addition, are not entirely reliable. For example, it is possible that the hooks may fail to operate due to binding of the parts or due to some defect in the hood operating means. Thus, work carriers may become stranded or jammed, necessitating stopping the entire conveyor system as well as associated production equipment. In the second place, control of movement of the work carriers along the supplemental tracks is lost during coasting of the carriers along the latter tracks rendering it practically impossible to maintain the proper spacing of adjacent carriers on the supplemental track required to assure operation of the control switches at the proper time to transfer selected work carriers to positions on one or more branch tracks.

With the above in view, it is an object of this invention to provide a power and free conveyor system wherein the objections noted above are overcome by a relatively simple, inexpensive structure which is entirely reliable in its operation. In accordance with this invention, the work carriers are released from the power driven trolleys as the carriers approach the supplemental tracks and are pushed along the latter tracks by the power driven trolleys in a manner such that adjacent carriers are maintained in predetermined spaced relationship while being propelled along the supplemental tracks. As a result of this arrangement, selected carriers may be switched to branch tracks and subsequently returned to positions in operative relationship with unoccupied trolleys without interferring with continued advancement of the other carriers by the power driven conveyor.

The foregoing as well as other objects will be made more apparent as this description proceeds especially when considered in connection with the accompanying drawing, wherein:

Figure 1 is a semi-diagrammatic side elevational view of a part of a conveyor system embodying the features of this invention;

Figure 2 is a sectional view taken on the line 2—2 of Figure 1; and

Figure 3 is a diagram of the conveyor system.

The conveyor system selected for the purpose of illustrating the present invention comprises a main track 10, a plurality of trolleys 11, a corresponding number of work carrying units 12, and supplemental tracks 13 supported in any suitable manner on frame structure 13'. The main track 10 may be of any desired construction and is secured in an elevated position on suitable supporting structure 14. In Figure 3 of the drawings, the main track 10 is shown as extending throughout a continuous path of travel, although it should be understood that this path of travel may vary, depending on the particular application.

The trolleys 11 are supported by the track 10 in predetermined spaced relationship lengthwise of the track 10, and are driven by a flexible linear member 15 in the form of a chain. The chain 15 is located directly below the track 10 in parallel relationship thereto and is suitably secured to the respective trolleys 11. The chain 15 is connected to a conventional power operated drive assembly (not shown) and is continuously driven by the latter to advance the trolleys 11 along the track 10.

Each trolley 11 has an elongated plate 16 extending parallel to the track 10 below the chain 15 and has a pusher in the form of a hook 17 secured to the underside of the plate 16 intermediate the ends of the latter. The opposite ends of the plate 16 are respectively secured to the lower ends of suitable hangers 18 having the upper ends respectively supported by a pair of rollers 19 which in turn have a rolling engagement with the track 10. The hangers 18 respectively extend through adjacent links of the chain 15 and in this manner are secured to the chain 15 for movement as a unit with the latter.

Each work carrier 12 comprises a support 20 suspended at an elevation below the free track 13 by a hanger 21 having an angle plate 22 and having flanged rollers 23. As shown in Figure 2 of the drawings, the base flange of the angle plate underlies the free track 13 and is secured to the member 20 intermediate opposite side edges of the latter. The upright flange 22' of the angle plate 22 extends to one side of the free track 13 and forms a support for the rollers 23. The rollers 23 are spaced from one another lenthwise of the supplemental tracks 13 and have a rolling engagement with the top edges of said tracks.

Secured to the plate 22 of each carrier 12 between the rollers 23 is a coupling member 24. The coupling member 24 projects upwardly from the plate 22 and is fashioned at the upper end with a hook 25. The hook 25 opens rearwardly with respect to the direction of advancement of the trolley 11 by the chain 15 and is located in the path of travel of the hooks 17 carried by the trolleys 11. In this connection it will be noted that the hooks 17 open in the direction of advancement of the trolleys by the chain 15 in a manner to releasably engage the respective hook portions 25 on the carriers 12 to suspend the latter from the trolleys. More particularly, each hook 17 comprises laterally spaced depending arms 26 which curve downwardly and forwardly toward their lower ends and are connected together at the lower ends by a bar 27 which serves to engage the hook 25 on an adjacent carrier 12.

The effective length of each coupling member 24 is greater than the distance between the upper edges of the supplemental tracks 13 and the bars 27 on the hooks 17 by an amount such that when the carriers 12 are supported by the tracks 13, the hook portions 25 are disengaged from the bars 27 of adjacent hooks 17. More particularly, the hooks 25 of the carriers 22 are spaced a substantial distance above the bars 27 of adjacent hooks 17 when the carriers are supported on the tracks 13, and the bars 27 abut the rear sides of the coupling members 24 in a manner such that the carriers 12 are pushed along the tracks 13 by the power driven trolleys 11.

In the present illustration, a length of free track section 13 extends for a limited distance along opposite sides of the conveyor path shown in Figure 3 of the drawing and the carriers 12 are advanced along the tracks 13 by engagement of the bars 27 on the hooks 17 of the trolleys 11 with the rear sides of the adjacent coupling members 24 on the work carriers 12. It is to be understood that prior to engagement of the flanged rolls 23 on the work carriers 12 with the tracks 13, the coupling members 24 are suspended from the hooks 17 on adjacent trolleys 11 and, hence, are carried by the trolleys along the main track 10. The receiving ends of the tracks 13 are tapered as at 28 in order to guide the carriers 12 in an upward direction from their suspended positions and thereby release the hooks 25 on the couplings 24 from the hooks 17 on adjacent trolleys 11.

It follows from the above that when the work carriers 12 are supported on the free tracks 13, the hooks 25 on the coupling members 24 are released from the hooks 17 on the adjacent trolleys and the bars 27 of the hooks 17 merely have an abutting engagement with the rear sides of adjacent coupling members 24 well below the hooks 25. In other words there is no interlocking or interengaging connection between the hooks 17 and coupling members 24 during free movement of the carriers 12 along the tracks 13. Thus, it is possible to switch selected work carriers from a track 13 at one side of the path of travel of the trolleys to positions on branch tracks 29 and to also subsequently return the work carriers from their positions on the branch tracks to positions on the track 13 at the opposite side of the path of travel of the trolleys without interfering with advancement of the trolleys along the main track 10 by the power driven chain 15.

In the present instance, the track 13 at each side of the path of travel of the trolleys 11 has switches 30 pivotally supported at one end by pins 31 for swinging movement in opposite directions to enable alternately registering the free ends thereof with the branch tracks 29. The means for swinging the switches 30 forms no part of this invention and any suitable mechanism may be provided for this purpose such, for example, as hydraulically operated cylinders indicated in Figure 3 by the numeral 32. It will also be noted from Figure 3 that the switches 30 of the track 13 at one side, the lower side as viewed in Figure 3, of the path of travel of the trolleys are pivoted at their rear ends so that work carriers being pushed along this track in the direction of the arrows may be switched onto the branch tracks 29. The switches 30 of the track 13 at the opposite side of the path of travel of the trolleys are pivoted at their front ends to enable returning the carriers 12 from the branch tracks 29 to positions on the adjacent track 13 in the path of travel of the trolleys 11. The branch tracks 29 may be and preferably are inclined in a direction to permit the carriers 12 to coast along the branch tracks 29 towards the track 13 at the return side of the conveyor.

The hydraulic cylinders 32 connected to the switches 30 of the track 13 at the receiving ends of the branch tracks 29 are respectively controlled by a pair of limit switches 33 and 33' which are electrically interlocked in a circuit in a manner such that both limit switches must be operated simultaneously in order to swing the adjacent switch 30 to its open position in registration with the receiving end of one of the branch tracks 29. The limit switch 33 of each pair is operated by a flag 34 fixed on each carrier 12 and the limit switch 33' of said pair is operated by a flag 35 also mounted on each carrier 12. The flags 35, however, are supported by the respective carriers for adjustment in opposite directions lengthwise of the path of travel of the carriers so that switching of individual carriers being pushed along the track 13 at the receiving ends of the branch tracks 29 may be predetermined. More particularly, preselected carriers 12 may be switched onto a selected branch track 29 by merely locating the flags 35 on said carriers in positions such that these flags coact with the flags 34 on the respective carriers to simultaneously trip both the limit switches 33 and 33' of the pair controlling the track switch 30 adjacent the selected branch track 29. The flags 35 on the remaining carriers 12 are, of course, positioned in out of phase relationship with the companion flags 34 so that the limit switches 33 and 33' are sequentially tripped and hence have no effect on the switch operating means 32. Moreover, if desired, limit switches 37 may be respectively supported adjacent the branch tracks 29 in positions to be operated by carriers 12 switched onto the branch tracks. The limit switches 37 are also electrically interlocked with the respective pairs of limit switches 33 and 33' in a manner to render the latter inoperative to actuate the track switches 30 when the branch tracks are occupied by a carrier 12. It will further be noted that with the above arrangement the limit switches 33 and 33' of each pair may be spaced different distances from one another so that by adjusting the flags 35 on selected carriers 12 corresponding distances from the flags 34 on said carriers, it is possible to switch carriers 12 onto a preselected branch track 29.

The work carriers 12 on the branch tracks 29 are moved off the branch tracks 29 onto the track 13 at the delivery ends of the branch tracks by any suitable transfer mechanism which forms no part of this invention. For the purpose of illustration, each transfer mechanism is diagrammatically shown in Figure 3 as comprising an arm 38 and a hydraulic cylinder 39. One end of the arm 38 is pivotally supported to enable swinging the free end of the arm by the hydraulic cylinder 39 and the free end of the arm engages an abutment on the adjacent carrier 12. The arrangement is such that when the track switches 30 of the track 13 at the delivery ends of the branch tracks 29 are swung to their open positions, the carriers 12 may be pushed off the branch tracks by the arms 38 onto the adjacent track 13 where they again assume positions in the path of the trolleys 11.

The switches 30 associated with the track 13 at the delivery ends of the branch tracks 29 and the carrier transfer mechanisms are operated by the trolleys 11 as they approach the swinging ends of the track switches 30. As shown in Figure 3, limit switches 40 are respectively supported adjacent the swinging ends of the track switches 30 adjacent the delivery ends of the branch tracks 29 in positions to be engaged by flags 41 respectively mounted on the trolleys 11. Tripping of the limit switches 40 by the flags 41 renders the hydraulic cylinders 32 and 39 operative to successively swing the track switches 30 into registration with the delivery ends of the branch tracks 29 and to swing the arms 38 of the transfer mechanisms to push carriers 12 onto the adjacent track 13. The means for operating the hydraulic cylinders 32 and 39 in response to tripping the limit switches 40 forms no part of the present invention and hence are not shown herein.

The above arrangement is such that carriers 12 are moved off of the delivery ends of the branch tracks 29 onto the adjacent track 13 in advance of approaching trolleys 11 so that the bars 27 forming parts of the hooks 17 abut the rear sides of the coupling members 24 on the carriers 12 to push the latter along the free track. It is important to avoid transferring a carrier from the branch track 29 to the adjacent track 13 in advance of an approaching trolley 11 having a carrier 12 suspended therefrom. In order to avoid such a condition, limit switches 42 are respectively supported adjacent the limit switches 40 in positions to be engaged by the flags 34 on the respective carriers 12. The limit switches 42 are electrically interlocked with the limit switches 40 so that when the limit switches 42 are tripped, they prevent operation of the transfer mechanisms to push work carriers 12 off of the branch tracks 29 onto the adjacent track 13.

As stated above, the tracks 13 extend for only a limited distance along opposite sides of the path of travel of the trolleys 11 and the work carriers 12 are pushed along the free tracks by the respective trolleys 11. It has further been stated that during advancement of the carriers 12 along the tracks 13 by the trolleys 11, the bars 27 of the hooks 17 on the respective trolleys 11 engage the rear sides of the coupling members 24 on the carriers below the hooks 25 at the upper ends of the coupling members 24. Thus, re-engagement of the hooks 25 with the bars 27 may be accomplished by merely lifting the trolleys 11 relative to the carriers 12. As shown in Figure 1 of the drawings, the main track 10 is offset upwardly as at 44 in such relationship to the delivery ends of the tracks 13 that when the carriers 12 approach the delivery ends of the tracks 13, the associated trolleys 11 are raised by the offset portions 44 of the main track 10 sufficiently to re-engage the hooks 25 with the hooks 17. Hence, the carriers 12 are suspended from the adjacent trolleys 11 as the carriers leave the delivery ends of the tracks 13.

Although the tracks 13 extend in parallel relationship to the registering portions of the main track 10 to avoid coasting of the work carriers 12 and thereby assure continuous abutting engagement of the pushers or hooks 17 on the trolleys with the respective coupling members 24 on the carriers, nevertheless, provision is made at the delivery ends of the tracks 13 to assure proper registration of the hooks 17 and 25 at the time the trolleys 11 are raised relative to the carriers 12. In the present instance, the foregoing is accomplished by securing leaf springs 45 to the undersides of the respective tracks 13 adjacent the delivery ends of the latter in positions to engage adjacent portions of the carriers 12. The leaf springs 45 act as a friction brake for the carriers and thereby assure proper engagement of the hooks 17 on the respective trolleys 11 with the hooks 25 on the adjacent carriers when the trolleys 11 are raised by the offset portions 44 of the main track 10. It is to be understood that the leaf springs 45 merely serve as safety features to prevent accidental shifting movement of the carriers relative to associated trolleys. Under normal conditions the hooks 17 on the trolleys 11 continuously engage the coupling members 24 on the adjacent carriers 12 to push the latter throughout the length of the track sections 13. This is an important feature of the present invention in that it renders it possible to not only greatly simplify the installation but, in addition, assures accurate control of the switching and transfer mechanisms required for the reliable operation of conveyors of this type.

What I claim as my invention is:

1. In a conveyor system, an upper track, a trolley supported by said upper track for movement therealong, driving means for moving said trolley along said upper track in one direction, a lower track supported in spaced relation to said upper track beneath the latter in a common vertical plane therewith and having a receiving end portion and a main portion extending in said one direction from said receiving end portion, said main portion being parallel to said upper track, a carriage adapted to be supported on and to move freely along said lower track, a pusher rigidly mounted on and depending from said trolley, a coupling member rigidly mounted on and extending upwardly from said carriage and into the path of travel of said pusher when said carriage is supported on said lower track, said coupling member having a hook at the upper end opening in a direction opposite said one direction, said pusher having a part at the lower end engageable with said hook to support said carriage and advance the same in said one direction toward said lower track, said part of said pusher having a noninterlocking bearing engagement with said coupling member at a point spaced below said hook when said carriage is supported on said main portion of said lower track for pushing said carriage therealong in said one direction, said hook and part being readily disengageable upon relative movement of said trolley and carriage toward each other, and said receiving end portion of said lower track and said upper track converging in said one direction to relatively move said carriage and trolley toward each other sufficiently to disengage said hook and part and to engage said part with said coupling member at said point spaced below said hook to continue the advance of said carriage along the main section of said lower track by said trolley.

2. In a conveyor system, an upper track, a trolley supported by said upper track for movement therealong, driving means for moving said trolley along said upper track in one direction, a lower track supported in spaced relation to said upper track beneath the latter in a common vertical plane therewith and having a main portion parallel to said upper track and a delivery end portion extending in said one direction from said main portion, a carriage adapted to be supported on and to move freely along said lower track, a pusher rigidly mounted on and depending from said trolley, a coupling member rigidly mounted on and extending upwardly from said carriage and into the path of travel of said pusher when said carriage is supported on said lower track, said coupling member having a hook at the upper end opening in a direction opposite said one direction, said pusher having a part at the lower end having a non-interlocking bearing engagement with said coupling member at a point spaced below said hook when said carriage is supported on said main portion of said lower track for pushing said carriage therealong in said one direction, said hook and part being readily engageable upon relative movement of said trolley and carriage away from each other, said delivery end portion of said lower track and said upper track diverging in said one direction to relatively move said carriage and trolley away from each other sufficiently to engage said hook and part and thereby suspend said carriage from said trolley for continued advance of said carriage by said trolley beyond said lower track.

3. The structure as defined in claim 2 comprising a friction brake operatively connected to said lower track adjacent the delivery end portion thereof for engaging said carrier as the latter approaches said delivery end portion to frictionally resist advancement of said carriage by said pusher and thereby maintain a continuous bearing engagement between said pusher part and said coupling member during relative movement of said trolley and carriage away from each other for engagement of said pusher part and hook.

References Cited in the file of this patent

UNITED STATES PATENTS

| 1,701,310 | Saborsky | Feb. 5, 1929 |
| 1,875,966 | Webb et al. | Sept. 6, 1932 |
| 2,095,413 | Harrison | Oct. 12, 1937 |
| 2,344,155 | McBride et al. | Mar. 14, 1944 |
| 2,567,438 | McBride | Sept. 11, 1951 |
| 2,609,083 | Leach | Sept. 2, 1952 |
| 2,684,039 | King | July 20, 1954 |

FOREIGN PATENTS

| 911,487 | France | Mar. 18, 1946 |